(12) United States Patent
Okamura

(10) Patent No.: US 8,730,367 B2
(45) Date of Patent: May 20, 2014

(54) IMAGE PICKUP APPARATUS THAT DISPLAYS IMAGES IN PARALLEL ON DISPLAY UNIT HAVING TOUCH PANEL FUNCTION AND OTHER DISPLAY UNIT, CONTROL METHOD THEREFOR, AND STORAGE MEDIUM

(75) Inventor: Satoshi Okamura, Yokohama (JP)

(73) Assignee: Canon Kabushiki Kaisha (JP)

( * ) Notice: Subject to any disclaimer, the term of this patent is extended or adjusted under 35 U.S.C. 154(b) by 184 days.

(21) Appl. No.: 13/305,954

(22) Filed: Nov. 29, 2011

(65) Prior Publication Data

US 2012/0134642 A1 May 31, 2012

(30) Foreign Application Priority Data

Nov. 29, 2010 (JP) ................................. 2010-264959

(51) Int. Cl.
*H04N 5/222* (2006.01)
*H04N 5/225* (2006.01)
*G03B 13/02* (2006.01)
*G03B 7/04* (2006.01)

(52) U.S. Cl.
USPC ............ 348/333.06; 348/333.01; 348/333.02; 348/373

(58) Field of Classification Search
CPC ....... H04N 5/222; H04N 5/225; G03B 13/02; G03B 7/04; G03B 7/02; G03B 17/20; G03B 17/00
USPC ........ 348/333.01–333.13, 373, 374; 396/373, 396/374, 294, 281, 296
See application file for complete search history.

(56) References Cited

U.S. PATENT DOCUMENTS

| | | | | |
|---|---|---|---|---|
| 6,597,400 | B2 * | 7/2003 | Nishimura | 348/333.02 |
| 6,778,217 | B1 * | 8/2004 | Nishimura | 348/333.12 |
| 7,298,410 | B2 * | 11/2007 | Kim | 348/333.06 |
| 7,349,021 | B2 * | 3/2008 | Okada | 348/333.06 |
| 8,339,499 | B2 * | 12/2012 | Ohuchi | 348/333.02 |
| 2010/0315542 | A1 * | 12/2010 | Yoshino | 348/333.01 |

FOREIGN PATENT DOCUMENTS

JP 11-352389 A 12/1999

\* cited by examiner

*Primary Examiner* — Tuan Ho
*Assistant Examiner* — Marly Camargo
(74) *Attorney, Agent, or Firm* — Rossi, Kimms & McDowell LLP

(57) ABSTRACT

An image pickup apparatus that is capable of producing displays according to situations and limiting touch operations to be accepted, so that, for example, erroneous operations using a touch panel function can be reduced. The position of a touch panel portion with respect to an image pickup apparatus main body is detected, and it is determined whether or not an EVF is in use. When a display surface of the touch panel portion being at such a position as to face a subject taken by an image pickup unit is detected, and it is determined that the EVF is in use, control is performed to produce displays on the touch panel portion and disable at least a part of the touch panel function.

23 Claims, 6 Drawing Sheets

CLOSED-NORMAL POSITION
EVF:DISABLED

CLOSED-NORMAL POSITION
EVF:ENABLED

CLOSED-INVERTED
EVF:DISABLED

CLOSED-INVERTED
EVF:ENABLED

OPENED-NORMAL POSITION
EVF:DISABLED

OPENED-NORMAL POSITION
EVF:ENABLED

OPENED-INVERTED
EVF:DISABLED

OPENED-INVERTED
EVF:ENABLED

*FIG. 4*

| STATE OF PANEL WHEN THRESHOLD VALUES ARE $\theta 1$ AND $\theta 2$ | STATE OF EVF | |
|---|---|---|
| | DISABLED(OFF) | ENABLED(ON) |
| CLOSED -NORMAL POSITION | NOT DISPLAY | NOT DISPLAY |
| | DISABLED | DISABLED |
| CLOSED -INVERTED | DISPLAY | NOT DISPLAY |
| | ENABLED | DISABLED |
| OPENED -NORMAL POSITION | DISPLAY | DISPLAY |
| | ENABLED | ENABLED |
| OPENED -INVERTED | DISPLAY | DISPLAY |
| | ENABLED | DISABLED |

UPPER COLUMN : SCREEN DISPLAY
LOWER COLUMN : TOUCH PANEL INPUT

IMAGE PICKUP APPARATUS THAT DISPLAYS IMAGES IN PARALLEL ON DISPLAY UNIT HAVING TOUCH PANEL FUNCTION AND OTHER DISPLAY UNIT, CONTROL METHOD THEREFOR, AND STORAGE MEDIUM

BACKGROUND OF THE INVENTION

1. Field of the Invention

The present invention relates to an image pickup apparatus that displays images in parallel on a display unit having a touch panel function and another display unit, a control method therefor, and a computer-readable storage medium storing a program for implementing the method.

2. Description of the Related Art

Conventionally, there have been known electronic apparatuses capable of displaying images in parallel on a display unit having a touch panel function and another display unit. For example, as image pickup apparatuses such as digital video cameras which are electronic apparatuses, there have been known those which have an electronic viewfinder (EVF) and a vari-angle display unit rotating in the directions of two axes, i.e. an opening-closing direction and a vertical direction relative to an apparatus main body. Further, there has also been known the technique that this vari-angle display unit is configured as a touch panel that can be touched by a user with a finger to operate a camera so that the number of operation buttons can be reduced to downsize the main body of the camera.

There has also been proposed the technique that in a camera having the vari-angle touch panel as described above, shooting modes of the camera are switched when the touch panel faces ahead of the camera (Japanese Laid-Open Patent Publication (Kokai) No. H11-352389).

In the camera having the vari-angle touch panel, not only images taken by the camera but also information attracting some interest of a person who is a subject can be displayed on the touch panel facing ahead. Thus, user's eyes can be turned to the camera without giving any instructions.

Moreover, operational instructions can be given to a person who is as a subject by displaying not only images but also characters on the touch panel. This can be used to prevent voice instructions from being recorded when voices are recorded as in the case of moving image recording.

Further, in so-called "self shooting" in which a user turns a lens toward himself/herself and takes a picture, the user inverts the touch panel vertically while keeping it open so as to turns the image taking direction of the camera to the user. At this time, the user can see the touch panel and perform touching operations, he/she can take a picture while grasping of shooting conditions such as the angle of view at which an image is taken.

However, particularly in video cameras, when the touch panel is open, the function of accepting touch operations (touch panel function) is always enabled (ON) under normal conditions. Thus, for example, when shooting is performed with the touch panel facing ahead of the camera, the touch panel may be accidentally touched. In particular, when a child or an animal as a subject lies in front of the camera, they may come too close to the camera and touch the touch panel, and this may be recognized as an unintended touch operation and cause an erroneous operation.

Also, when the touch panel is moved in the closing direction and retracted at a closed position where it is closely attached to the apparatus main body, the touch panel can be retracted in such a manner that its display surface faces outward of the apparatus main body with the touch panel turned upside down. In this case as well, the touch panel function is still enabled, the user may touch the touch panel by mistake, and this may cause an unintended erroneous operation.

Thus, depending on combinations of the positions of the vari-angle touch panel rotating in the directions of the two axes, touch inputs unintended by a user may be accepted, and this may cause erroneous settings and operations.

SUMMARY OF THE INVENTION

The present invention provides an image pickup apparatus that is capable of producing displays and limiting touch operations to be accepted according to situations so that, for example, erroneous operations using a touch panel function can be reduced, a control method therefor, and a computer-readable storage medium storing a program for implementing the method.

Accordingly, a first aspect of the present invention provides an image pickup apparatus capable of displaying images in parallel on a first display unit, which is movable relative to an image pickup apparatus main body having an image pickup unit and includes a touch panel function, and a second display unit, comprising a detection unit configured to be capable of detecting a position of the first display unit with respect to the image pickup apparatus main body, a determination unit configured to determine whether the second display unit is in use, and a control unit configured to perform control to produce displays on the first display and disable at least a part of the touch panel function when the detection unit detects a display surface of the first display unit being at such a position as to face a subject taken by the image pickup unit, and the determination unit determines that the second display unit is in use.

Accordingly, a second aspect of the present invention provides a control method for an image pickup apparatus capable of displaying images in parallel on a first display unit, which is movable relative to an image pickup apparatus main body having an image pickup unit and includes a touch panel function, and a second display unit, comprising a detection step of detecting a position of the first display unit with respect to the image pickup apparatus main body, a determination step of determining whether the second display unit is in use, and a control step of performing control to produce displays on the first display and disable at least a part of the touch panel function when a display surface of the first display unit being at such a position as to face a subject taken by the image pickup unit is detected in the detection step, and it is determined in the determination step that the second display unit is in use.

Accordingly, a third aspect of the present invention provides a computer-readable non-transitory storage medium storing a program for implementing a method as described above.

According to the present invention, because displays can be produced, and touch operations to be accepted can be limited according to situations, so that, for example, erroneous operations using a touch panel function can be reduced.

Further features of the present invention will become apparent from the following description of exemplary embodiments (with reference to the attached drawings).

BRIEF DESCRIPTION OF THE DRAWINGS

FIG. 4 is a conceptual diagram showing how a display function and a touch panel function of a touch panel portion are controlled according to combinations of moving states of the touch panel portion and the EVF.

DESCRIPTION OF THE EMBODIMENTS

The present invention will now be described in detail with reference to the drawings showing embodiments thereof.

Figure 1A:
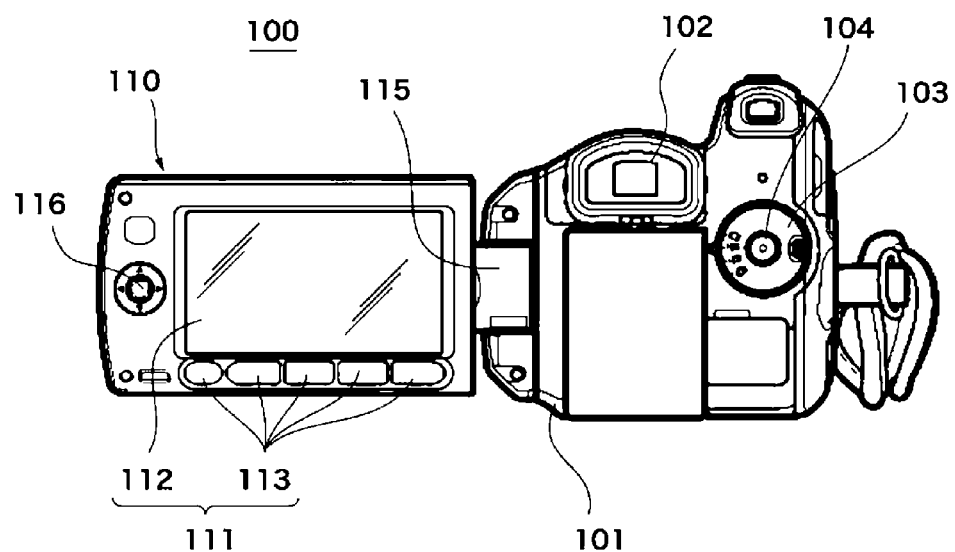
FIGS. 1A and 1B are a back view and a perspective view, respectively, showing an electronic apparatus according to an embodiment of the present invention.
Figure 1B:
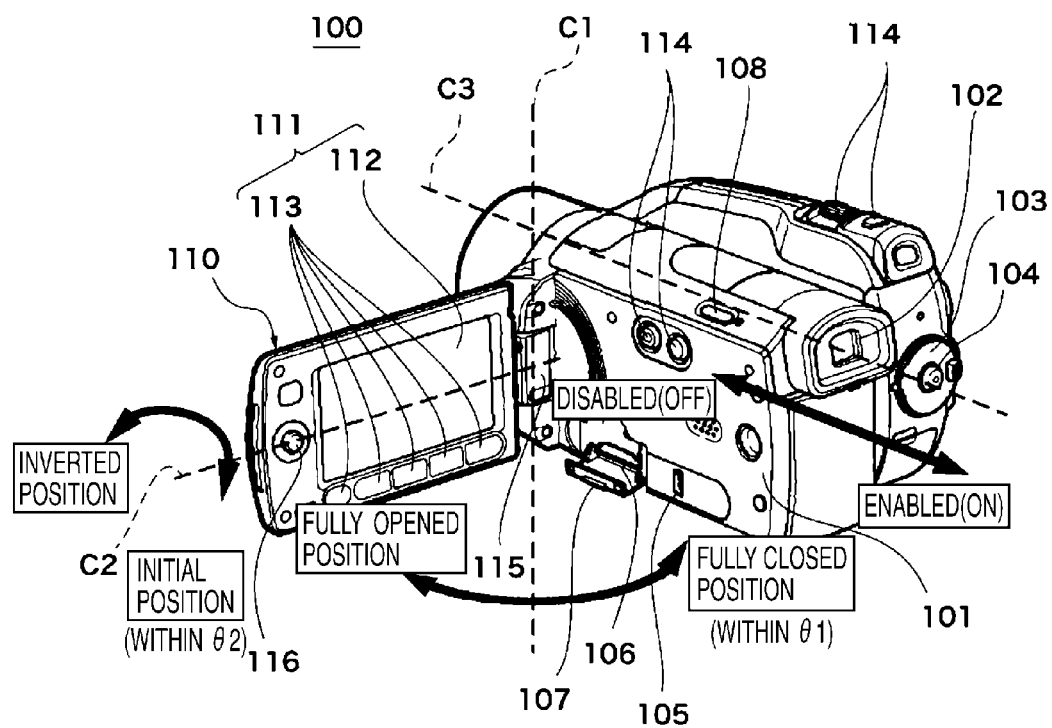

FIGS. 1A and 1B are a back view and a perspective view, respectively, showing an electronic apparatus according to an embodiment of the present invention. The electronic apparatus is configured as, for example, a digital video camera (hereafter referred to as the "camera") 100. The camera 100 has a vari-angle movable panel 110 which is a first display unit, and a movable electronic view finder (hereafter referred to as the "EVF") 102 which is a second display unit. A subject side in the direction of an optical axis in image pickup is regarded as a front side, and vertical and horizontal directions are referred to as directions viewed by an operator (user) on a rear side. Thus, FIG. 1A shows a back surface, and FIG. 1B shows a back surface, a left side surface, and an upper surface. In FIGS. 1A and 1B, there is shown a state in which the movable panel 110 is opened.

An apparatus main body 101 has a trigger button 104 for instructing shooting, a mode selector switch 103 for switching between various modes, and an operation element group 114 comprised of various switches and buttons which accept various operations from a user. The apparatus main body 101 also has a power switch 108 for turning on or off power, and a connector 105 for connecting to an external apparatus via a connecting cable, not shown. Further, the apparatus main body 101 has a recording medium slot 106 for storing a recording medium 57 (see FIG. 2) comprised of a memory card, a hard disk, a semiconductor memory, or a magnetic disk. The recording medium 57 stored in the recording medium slot 106 is capable of communicating with the camera 100. The recording medium slot 106 is protected by a cover 107.

The EVF 102 is configured to be slidable in the direction of an axis C3 (FIG. 1B) (longitudinal direction) so as to be pulled out or retracted. The EVF 102 has a display function thereof automatically enabled (ON) and disabled (OFF) according to the position to which the EVF 102 is pulled out. The display function is disabled within the range of a predetermined amount from a front end position and enabled when the EVF 102 is pulled out a predetermined amount or more rearward from the front end position.

A set button 116 including a four-way key and a touch panel portion 111 are disposed on a surface on the same side of the movable panel 110. The touch panel 111 includes a main display surface 112 which displays images and various information, and a plurality of touch operating portions 113. The main display surface 112 and the touch operating portions 113 have a touch panel function of accepting instructions via contact using a finger or a pen, as well as the display function.

The movable panel 110 is configured to be rotatable about an axial portion 115 in the directions of two axes perpendicular to each other. First, with respect to the apparatus main body 101, the movable panel 110 rotates about a first rotation axis C1 between a "fully closed position" and a "fully opened position" to open or close, and rotates about a second rotation axis C2 between an "initial position" and an "inverted position". Here, the "fully closed position" is a position at which the movable panel 110 is close to or abuts on the apparatus main body 101 in the state of facing the apparatus main body 101 in the direction in which the movable panel 110 is opened and closed. The "fully opened position" is a position to which the movable panel 110 has rotated 90° from the fully closed position in the direction in which the movable panel 110 is opened. The fully closed position and the fully opened position are defined by the angles of rotation about the first rotation axis C1 irrespective of rotational positions about the second rotation axis C2.

The "initial position" means a position at which an inner surface of the movable panel 110 which is a surface on the same side as the main display surface 112 is close to or abuts on the apparatus main body 101 in the state of facing the apparatus main body 101 when the movable panel 110 is parallel with a vertical direction (the direction of the first rotation axis C1) and at the fully closed position. When the movable panel 110 is at the fully opened position and the initial position, the inner surface of the movable panel 110 faces rearward as shown in FIGS. 1A and 1B. The movable panel 110 is capable of rotating from the initial position so that the main display surface 112 can gradually face upward and eventually face in a direction opposite to the initial position. This rotational direction is particularly referred to as the "inverting direction". The angle of rotation from the initial position to the inverted position is 180°. The direction in which the movable panel 110 rotates back and forth about the second rotation axis C2 is also referred to as the "vertical rotational direction" for convenience's sake. It should be noted that a rotation range (for example, 90°) may be provided in the direction opposite to the inverting direction.

Figure 2:
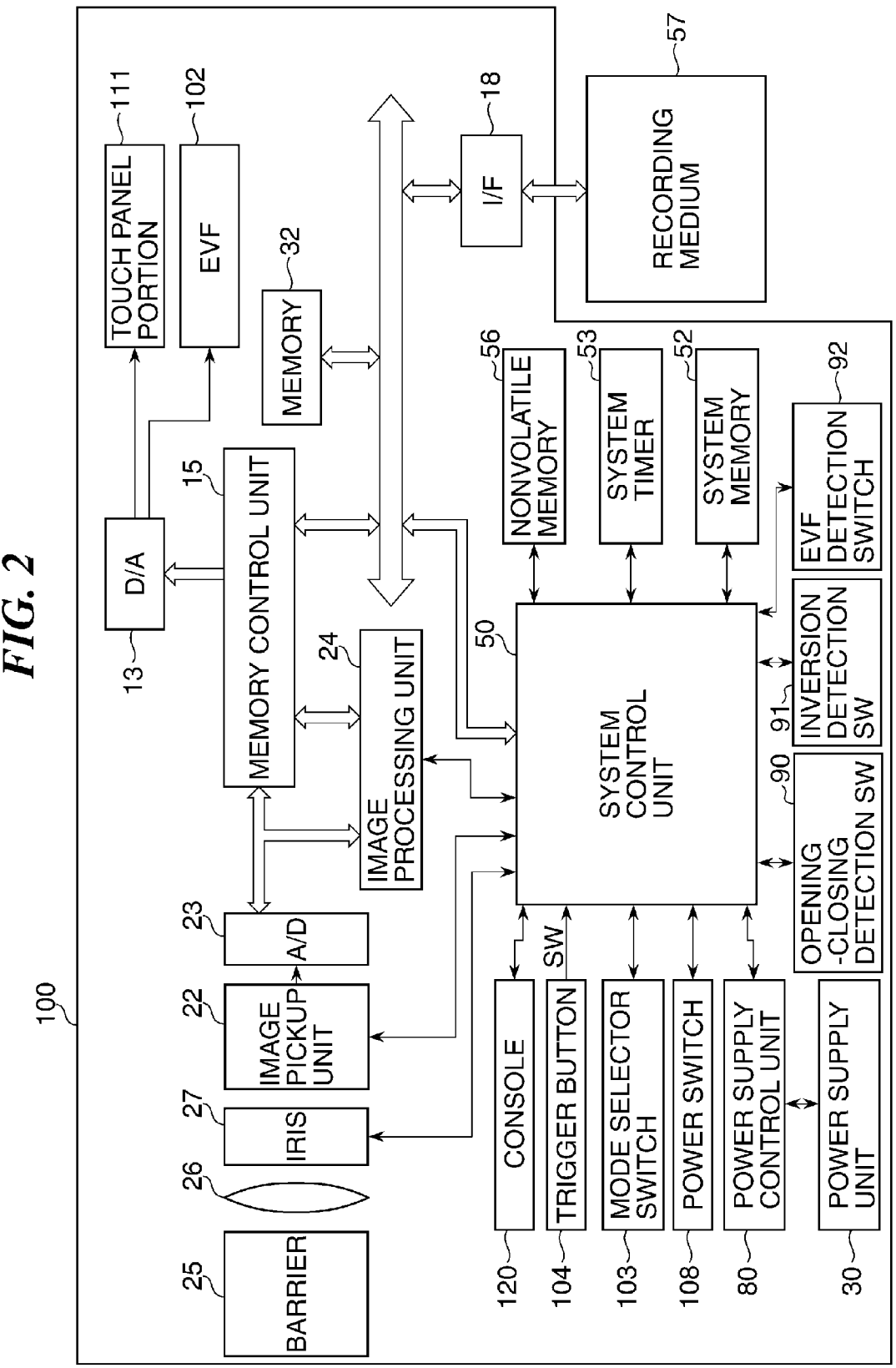
FIG. 2 is a block diagram schematically showing an internal arrangement of a camera.

FIG. 2 is a block diagram schematically showing an internal arrangement of the camera 100.

The camera 100 has a system control unit (a determination unit and a control unit) 50 which controls the entire camera 100. The camera 100 has a barrier 25, a taking lens 26 including a focus lens, an iris 27 having a diaphragm function, an image pickup unit 22 comprised of a CCD or CMOS which converts an optical image into an electric signal, an A/D converter 23, an image processing unit 24, and a memory control unit 15. The A/D converter 23 is used to convert an analog signal output from the image pickup unit 22 into a digital signal. The barrier 25 covers the taking lens 26 so as to prevent an image pickup system including the taking lens 26, the iris 27, and the image pickup unit 22 from becoming dirty or damaged.

The image processing unit 24 carries out predetermined pixel interpolation, resizing processing such as reduction, and color conversion processing on data from the A/D converter 23 or data from the memory control unit 15. Also, the image processing unit 24 carries out predetermined arithmetic processing using taken image data, and the system control unit 50 perform exposure control and distance measurement control based on obtained arithmetic processing results. Thus, AF (auto focus) processing and AE (automatic exposure) processing are performed. The image processing unit 24 further carries out predetermined arithmetic processing using taken image data and carries out AWB (auto white balance) processing based on obtained arithmetic processing results.

The system control unit 50 also controls display by controlling a memory 32, a D/A converter 13, the touch panel portion 111 (FIGS. 1A and 1B), the EVF 102 (FIGS. 1A and 1B), and so on. Output data from the A/D converter 23 is written into the memory 32 via the image processing unit 24 and the memory control unit 15, and also directly written into the memory 32 via the memory control unit 15. The memory 32 stores image data obtained by the image pickup unit 22 and converted into digital data by the A/D converter 23, and image data to be displayed on the touch panel portion 111 of the movable panel 110. The memory 32 has enough storage capacity for storing a predetermined number of still images or moving images and sound for a predetermined time period.

The memory 32 also serves as an image display memory (video memory). Image display data stored in the memory 32 is converted into analog signals by the D/A converter 13 and supplied to the touch panel portion 111. Thus, display data written into the memory 32 is displayed by the touch panel portion 111 and the EVF 102 via the D/A converter 13.

The touch panel portion 111 of the movable panel 110 and the EVF 102 are comprised of an LCD or the like, and the system control unit 50 causes the touch panel portion 111 and the EVF 102 to produce displays according to analog signals from the D/A converter 13. The system control unit 50 causes the D/A converter 13 to convert digital signals, which are obtained as a result of A/D conversion by the A/D converter 23 and accumulated in the memory 32, into analog signals and successively transfer them to the touch panel portion 111 and the EVF 102, which in turn produce displays. Thus, the function of displaying through-the-lens images can be fulfilled.

A nonvolatile memory 56 is an electrically erasable and recordable memory, and for example, an EEPROM is used. The nonvolatile memory 56 stores constants, programs, and so on for operation of the system control unit 50. The programs mean programs for executing flowcharts described later in the description of the present embodiment.

The system control unit 50 realizes processes described later by executing programs recorded in the nonvolatile memory 56. A RAM is used as a system memory 52. Constants and variables for operation of the system control unit 50, programs read out from the nonvolatile memory 56, and so on are expanded in the system memory 52. A system timer 53 is a timer unit that measures time periods used for various types of control, and time periods of a built-in clock.

A power supply control unit 80 is comprised of a battery detection circuit, a DC-DC converter, a switch circuit that switches blocks to be energized, and so on (all of them are not shown), and detects whether or not a battery is mounted, the type of a battery, and remaining battery level. Also, the power supply control unit 80 controls the DC-DC converter based on the results of detection and instructions from the system control unit 50 to supply required voltage to components including the recording medium 57 for a required period of time.

A power supply unit 30 is comprised of a primary battery such as an alkali battery or a lithium battery, a secondary battery such as a NiCd battery, a NiMH battery, or a Li battery, an AC adaptor, and so on (all of them are not shown). An interface (I/F) 18 enables acceptance and transmission of information to and from the recording medium 57.

The mode selector switch 103 (see FIGS. 1A and 1B as well) switches the operation mode of the system control unit 50 to any of a still image recording mode, a moving image recording mode, a reproducing mode, and so on. The trigger button 104 (see FIGS. 1A and 1B as well) generates a start-stop signal SW when operated. In response to the start-stop signal SW, the system control unit 50 starts recording moving images to start sequential recording operations unless the camera 100 is recording moving images. Conversely, when the camera 100 is recording moving images, recording operations are stopped to bring the recoding of moving images to an end.

A console 120, an opening/closing detection switch (SW) 90, an inversion detection switch (SW) 91, an EVF detection switch (SW) 92 as well as the mode selector switch 103 and the trigger button 104 play a role in inputting various operational instructions to the system control unit 50. The opening/closing detection switch (first detection unit) 90 and the inversion detection switch (second detection unit) 91 act as "detection units" that detect moving positions of the movable panel 110.

The console 120 has operation members including the touch panel portion 111 (the main display surface 112 and the touch operating portions 113), the operation element group 114, and the set button 116 described above with reference to FIGS. 1A and 1B. Functions are allotted to the operation members of the console 120 according to scenes by selectively operating various function icons displayed on the touch panel portion 111 and the EVF 102, so that the operational members act as function buttons.

Examples of the function buttons include an end button, a back button, a next image button, a jump button, a narrow-down button, and an attribute modification button. For example, when a menu button is depressed, various setting menu screens allowing configuration of settings are displayed on the touch panel portion 111 and the EVF 102. The user can intuitively configure settings using the menu screens displayed on the touch panel portion 111 and the EVF 102, as well as the set button 116.

As described above, the touch panel portion 111 has a touch panel function, and the system control unit 50 is capable of detecting operations described below on the touch panel portion 111.

Touch with a finger or a pen (hereafter referred to as a touch-down)

Touching with a finger or a pen (hereafter referred to as a touch-on)

Moving while touching with a finger or a pen (hereafter referred to as a move)

Move a touching finger or pen off (hereafter referred to as a touch-up)

Touched by nothing (hereafter referred to as a touch-off)

Information on these operations and the coordinates of positions on the touch panel portion 111 touched by a finger or a pen is supplied to the system control unit 50 via an internal bus, and the system control unit 50 determines what type of operation has been performed based on the supplied information.

As for a move, the direction in which a finger or a pen moves on the touch panel portion 111 can be determined with respect to each vertical component/horizontal component based on changes in positional coordinates. Also, when a touch-up is done after a predetermined move from a touch-down on the touch panel portion 111, it is thought that a stroke has been drawn. An act of quickly drawing a stroke is called a "flick". The flick is an act of quickly moving a finger touching the touch panel portion 111 to a certain distance and moving the finger off the touch panel portion 111, and in other words, an act of moving a finger over the touch panel portion 111 just like flicking the touch panel portion 111. When a move for a predetermined distance or longer and at a predetermined speed or higher is detected, and then a touch-up is detected, it can be determined that a "flick" has been done. Also, when a move for a longer distance than a predetermined distance and at a lower speed than a predetermined speed is detected, it can be determined that a "drag" has been done.

The touch panel portion 111 may be of any type selected from the following various types of touch panel: a resistive type, a capacitance type, a surface acoustic wave type, an infrared type, an electromagnetic induction type, an image recognition type, an optical sensor type, and so on.

The opening/closing detection switch 90 and the inversion detection switch 91 detect the position of the movable panel 110 in the direction of opening and closing about the rotation axis C1 (FIG. 1B) and the position of the movable panel 110 in the direction of rotation about the second rotation axis C2 (FIG. 1B).

Specifically, when the position of the movable panel 110 in the direction of opening and closing lies outside the range of a "first predetermined angle θ1" from the fully closed position toward the fully opened position about the first rotation axis C1, the opening/closing detection switch 90 outputs the corresponding signal. Also, when the position of the movable panel 110 in the direction of vertical rotation lies outside the range of a "second predetermined angle θ2" in the inverting direction from the initial position, the inversion detection switch 91 outputs the corresponding signal.

Then, in response to the signals, the system control unit 50 detects (determines) the present position of the movable panel 110 in the direction of opening and closing and the present position of the movable panel 110 in the direction of vertical rotation. In the present embodiment, because the system control unit 50 detects the positions of the movable panel 110 using the first predetermined angle θ1 and the second predetermined angle θ2 as threshold values, the positions of the movable panel 110 are each substantially determined in two stages, that is, based on which of two ranges (angle ranges) is a range where the movable panel 110 is positioned.

When the position of the movable panel 110 in the opening-closing direction is positioned within the range from the fully closed position to the first predetermined angle θ1, the system control unit 50 determines that the movable panel 110 lies in a "closed state", and when the position of the movable panel 110 in the opening-closing direction is positioned in the range from the first predetermined angle θ1 to the fully opened position, the system control unit 50 determines that the movable panel 110 lies in an "opened state". Here, the value of the first predetermined angle θ1 is a value close to 0° (for example, 5°), but the present invention is not limited to this.

Also, when the position of the movable panel 110 in the vertical rotational direction is positioned within the range from the initial position to the second predetermined angle θ2 in the inverting direction, the system control unit 50 determines that the movable panel 110 is at a "normal position", and when the position of the movable panel 110 in the vertical rotational direction is positioned within the range from the second predetermined angle θ2 to the inverted position, the system control unit 50 determines that the movable panel 110 is at an "inverted position". It should be noted that when an vertical rotational range is also provided within a range of 90° in a direction opposite to the inverting direction from the initial position, it may be determined that within this range, the movable panel 110 is at a "normal position".

When the movable panel 110 is switched from the normal position to the inverted position, the system control unit 50 performs control so as to vertically invert display on the touch panel portion 111. Also, directions and positions of displayed various information may be switched.

The EVF detection switch 92 detects the position of the EVF 102 in the direction of the axis C3 (FIG. 1B). Specifically, upon detecting the EVF 102 pulled out rearward from the retracted position at the front end position by a predetermined amount or more, the EVF detection switch 92 outputs the corresponding signal. In response to this signal, the system control unit 50 detects (determines) the present position of the EVF 102 in the direction of the axis C3. In the present embodiment, because the position of the EVF 102 is detected using the predetermined amount mentioned above as a threshold value, the position of the EVF 102 is substantially determined in two stages, that is, based on which of two ranges (stroke ranges) is a range where the EVF 102 is positioned.

When the position of the EVF 102 lies inside the range of the predetermined amount from the retracted position, the system control unit 50 performs control to disable (OFF) the display function of the EVF 102. On the other hand, when the position of the EVF 102 lies outside the range of the predetermined amount from the retracted position, the system control unit 50 performs control to enable (ON) the display function of the EVF 102. The state where the display function of the EVF 102 is enabled (ON) corresponds to a state where the EVF 102 is "in use".

Because both the movable panel 110 and the EVF 102 are movable as described above, they can take various positions. Also, because the switches 90, 91, and 92 are provided to detect the moving states of the movable panel 110 and the EVF 102, the system control unit 50 can ascertain the state where the camera 100 is. A description will now be given of combinations of the states of the movable panel 110 and the EVF 102, and how the display function and the touch panel function of the touch panel portion 111 are controlled in each combination.

Figure 3A:
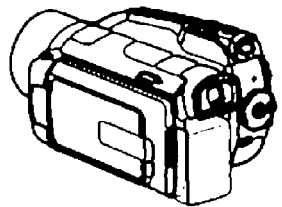
FIGS. 3A to 3H are views showing combinations of moving states of a touch panel portion of a movable panel and an EVF.
Figure 3B:
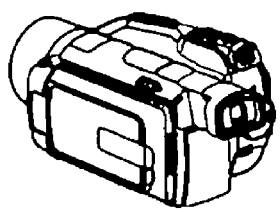
Figure 3C:
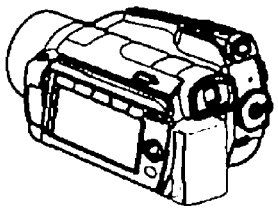
Figure 3D:
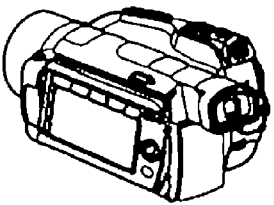
Figure 3E:
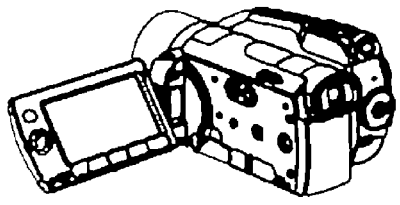
Figure 3F:
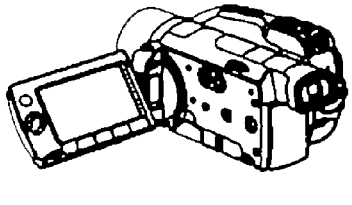
Figure 3G:
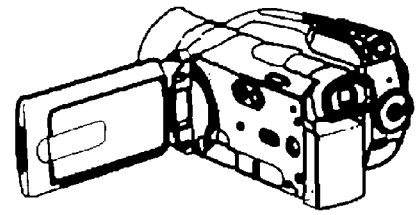
Figure 3H:
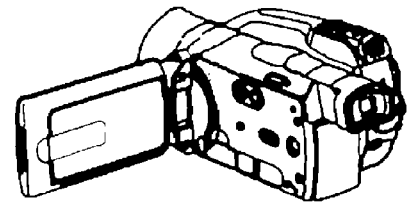

FIGS. 3A to 3H are views showing combinations of moving states of the touch panel portion 111 of the movable panel 110 and the EVF 102. FIG. 3A shows a state where the position of the movable panel 110 in the opening-closing direction is the "closed state", the position of the movable panel 110 in the vertical rotational direction is the "normal position", and the EVF 102 is disabled. This is abbreviated as "closed—normal position, EVF: disabled". Likewise, FIG. 3H shows a state where the position of the movable panel 110 in the opening-closing direction is the "opened state", the position of the movable panel 110 in the vertical rotational direction is the "inverted position", and the EVF 102 is enabled. This is abbreviated as "opened—inverted, EVF: enabled". In the other figures of FIGS. 3A to 3H, the states are similarly abbreviated. Thus, there are eight conceivable combinations.

FIG. 4 is a conceptual diagram showing how the display function and the touch panel function of the touch panel portion 111 are controlled according to combinations of moving states of the touch panel portion 111 and the EVF 102. FIG. 4 corresponds to the eight states shown in FIGS. 3A to 3H. In FIG. 4, "panel state" means a combination of the positions of the touch panel portion 111 in the opening-closing direction and the vertical rotational direction determined by the system control unit 50 using the first predetermined angle θ1 and the second predetermined angle θ2 as threshold values. In "EVF state", the upper column shows whether the display function of the touch panel portion 111 controlled by the system control unit 50 is enabled (display)/disabled (not display). The lower column shows whether the touch panel function of the touch panel portion 111 controlled by the system control unit 50 is enabled/disabled. Disabling the touch panel function means that even when the touch panel portion 111 is touched, this is not accepted as an input or an instruction.

As shown in FIG. 4, in the state of "closed—normal position, EVF: disabled" (FIG. 3A), the movable panel 110 facing inward and fully closed is retracted in the state of being in abutment on or close proximity to the apparatus main body, and the EVF 102 is also retracted. In this case, the display function of the touch panel portion 111 is disabled (not display), and the touch panel function of the touch panel portion 111 is disabled. In the state of "closed—normal position, EVF: enabled" (FIG. 3B), because only the EVF 102 is in use, the display function is disabled, and the touch panel function is disabled as in the case of FIG. 3A.

In the state of "closed—inverted, EVF: disabled" (FIG. 3C), because displays and touch operations using the touch panel portion 111 are required under normal conditions, the display function is enabled (display), and the touch panel function is enabled. In the state of "closed—inverted, EVF: enabled" (FIG. 3D), it is assumed that the user shoots while looking through the EVF 102, and in this case, the user may accidentally touch the touch panel portion 111. Therefore, the display function is disabled, and the touch panel function is disabled.

In the state of "opened—normal position, EVF: disabled" (FIG. 3E), it is assumed that the user shoots while looking at the touch panel portion 111, and in this case, the user may do input by touching the touch panel portion 111. Therefore, the display function is enabled, and the touch panel function is enabled.

In the state of "opened—normal position, EVF: enabled" (FIG. 3F), it is assumed that the user shoots while looking images displayed in parallel on the touch panel portion 111 and the EVF 102, and in this case, the user may do input by touching the touch panel portion 111. Therefore, the display function is enabled, and the touch panel function is enabled.

In the state of "opened—inverted, EVF: disabled" (FIG. 3G), it is assumed that the user lies in front of the camera 100 and does so-called self-shooting. In this case, the user may do input by touching the touch panel portion 111. Therefore, the display function is enabled, and the touch panel function is enabled.

In the state of "opened—inverted, EVF: enabled" (FIG. 3H), it is assumed that the user shoots while looking through the EVF 102 and showing a subject the display on mainly the main display surface 112 of the touch panel portion 111. In this case, the user lying behind the camera 100 is less likely to perform touch operations on the touch panel portion 111. On the other hand, when the subject lying in front of the front surface of the camera 100 is a child, an animal, or the like, they may touch the touch panel portion 110 accidentally or mischievously. Therefore, in this case, the display function is enabled, but the touch panel function is disabled. As a result, erroneous operations can be reduced.

Referring next to a flowchart, a description will be given of how the system control unit 50 controls the display function and the touch panel function of the touch panel portion 111 as described above.

Figure 5:
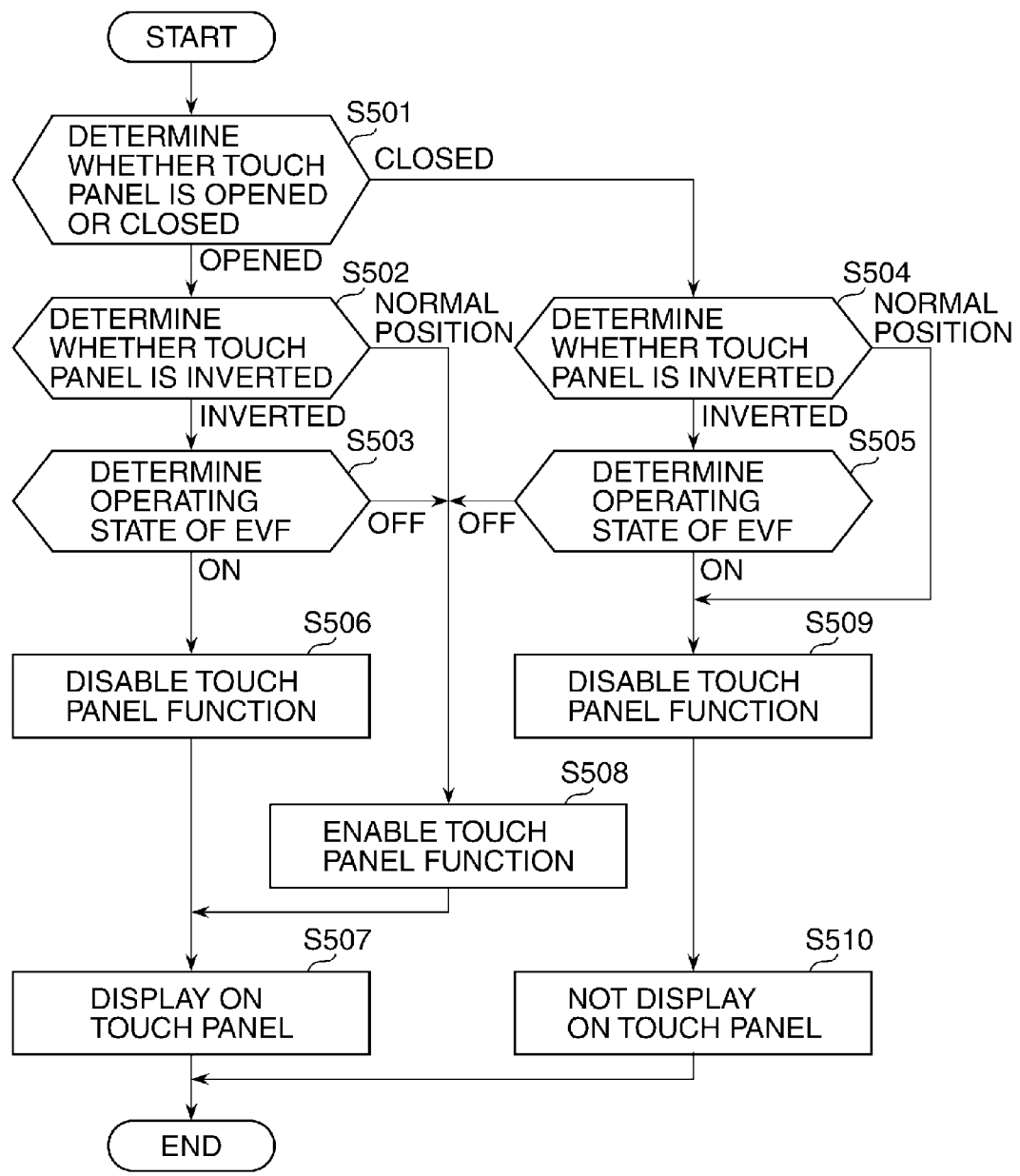
FIG. 5 is a flowchart of a function control process.

FIG. 5 is a flowchart of a function control process. This process is repeatedly carried out by the system control unit 50 at predetermined intervals while the camera 100 is operating.

First, in step S501, based on the result of detection by the opening-closing detection switch 90, the system control unit 50 determines whether the movable panel 110 is opened or closed (whether the state of rotation about the first rotation axis C1 is the closed state or the opened state). When, as a result of the determination, the movable panel 110 is opened, the system control unit 50 proceeds to step S502, and on the other hand, when the movable panel 110 is closed, the system control unit 50 proceeds to step S504.

In the step S502, based on the result of detection by the inversion detection switch 91, the system control unit 50 determines whether or not the movable panel 110 is inverted (whether the position of the movable panel 110 in the direction of vertical rotation about the second rotation axis C2 is the normal position or the inverted position). When, as a result of the determination, the movable panel 110 is at the inverted position, the system control unit 50 proceeds to step S503, and on the other hand, when the movable panel 110 is at the normal position, the system control unit 50 proceeds to step S508.

In the step S503, based on the result of detection by the EVF detection switch 92, the system control unit 50 determines whether or not the EVF 102 is in use, that is, whether or not the display function of the EVF 102 is working (enabled (ON) or disabled (OFF)). When, as a result of the determination, the EVF 102 is enabled, the system control unit 50 proceeds to step S506, and on the other hand, when the EVF 102 is disabled, the system control unit 50 proceeds to the step S508.

In the step S504, based on the result of detection by the inversion detection switch 91, the system control unit 50 determines whether or not the movable panel 110 is inverted (whether the movable panel 110 is at the normal position or the inverted position). When, as a result of the determination, the movable panel 110 is at the inverted position, the system control unit 50 proceeds to step S505, and on the other hand, when the movable panel 110 is at the normal position, the system control unit 50 proceeds to step S509.

In the step S505, based on the result of detection by the EVF detection switch 92, the system control unit 50 determines whether or not the EVF 102 is in use, that is, whether or not the display function of the EVF 102 is working (enabled (ON) or disabled (OFF)). When, as a result of the determination, the EVF 102 is enabled, the system control unit 50 proceeds to the step S509, and on the other hand, when the EVF 102 is disabled, the system control unit 50 proceeds to the step S508.

In the step S505, the system control unit 50 disables the touch panel function of the touch panel portion 111 of the movable panel 110. Namely, the system control unit 50 performs control such that even when the touch panel portion 111 is touched, this is not accepted as an input or an instruction. Then, in step S507, the system control unit 50 enables the display function of the touch panel portion 111 of the movable panel 110. Namely, the system control unit 50 performs control such that various function icons and menu screens are displayed on the touch panel portion 111, and then terminates present process.

On the other hand, in the step S508, the system control unit 50 enables the touch panel function of the touch panel portion 111. Namely, the system control unit 50 performs control such that when the touch panel portion 111 is touched, this is accepted as an input or an instruction, and proceeds to the step S507.

In the step S509, the system control unit 50 disables the touch panel function of the touch panel portion 111 as in the step S506. Then, in step S510, the system control unit 50 disables the display function of the touch panel portion 111. Namely, the system control unit 50 performs control such that various function icons and menu screens are not displayed on the touch panel portion 111, and then terminates present process.

For example, in the state of "closed—inverted, EVF: enabled" (FIG. 3D), the process proceeds in the sequence of the step S501→S504→S505→S509→S510. In the state of "opened—inverted, EVF: disabled" (FIG. 3G), the process proceeds in the sequence of the step S501→S502→S503→S508→S507. In the state of "opened—inverted, EVF: enabled" (FIG. 3H), the process proceeds in the sequence of the step S501→S502→S503→S506→S507.

According to the present embodiment, based on the results of detection by the switches 90, 91, and 92, the system control unit 50 determines whether the movable panel 110 is closed or opened, whether the movable panel 110 is at the normal position or the inverted position, whether the EVF 102 is enabled (ON) or disabled (OFF). According to combinations thereof, the system control unit 50 controls the display function and the touch panel function of the touch panel portion 111 of the movable panel 110.

Thus, the intent of the user can be estimated, and displays can be produced and acceptance of touch operations can be limited according to situations. For example, erroneous operations using the touch panel function can be reduced.

Specifically, for example, in the state of "opened—inverted, EVF: enabled" (FIG. 3H), the display function is enabled, and an indication of a warning such as a message or an image indicating shooting being underway is displayed on the touch panel portion 111 so as to draw user's attention, and also, the touch panel function is disabled. Thus, even when a subject ignores the warning indication and touches the touch panel portion 111 or accidentally touches the touch panel portion 111, this is not accepted and hence does not cause an erroneous operation.

On the other hand, in the state of "opened—inverted, EVF: disabled" (FIG. 3G), both the display function and the touch panel function are enabled. As a result, the user can not only shoot while grasping of shooting conditions, but also smoothly shoot himself/herself while intentionally operating the apparatus main body 101 by touch input.

In the state of "closed—inverted, EVF: enabled" (FIG. 3D), both the display function and the touch panel function are disabled. As a result, even when the user is shooting while looking through the EVF 102 in a state where the movable panel 110 is retracted at the closed position with its inner side facing outward, an erroneous operation can be prevented from being caused by a finger accidentally touching the touch panel portion 111.

The arrangement of the switches 90, 91, and 90 described above are only examples, and they may have any arrangements as long as they are configured to be capable of detecting positions. Moreover, in the present embodiment, the system control unit 50 determines whether or not the EVF 102 is in use based on a signal from the EVF detection switch 92. The present invention, however, is not limited to this, but whether or not the EVF 102 is in use may be determined based on whether or not the EVF 102 is taking a display action. It should be noted that although the EVF 102 is a movable type, a fixed type may be adopted. In this case, whether or not the EVF 102 is in use may be determined based on whether or not the user performs instructing operations for using the EVF 102.

In the present embodiment, the position of the movable panel 110 in the opening-closing direction and the vertical rotational direction and the position of the EVF 102 are each determined in two stages, that is, based on which of two ranges is a range to which they belong. The present invention, however, is not limited to this, they may be determined in three or more stages, that is, based on which of three ranges is a range to which they belong so that the display function and the touch panel function of the touch panel portion 111 can be minutely controlled.

Moreover, in the present embodiment, when the touch panel function is to be controlled, the whole touch panel functions are enabled or disabled. The present invention, however, is not limited to this, but control may be performed to disable only a part of the touch panel function. Examples of such control include control to disable touch in only a part of the touch panel portion 111 or disable touch operations of a specific type (touch-down, touch-up, move, flick, or the like).

An example in which only a part of the touch panel function is disabled is that a single touch (an act of touch-up after one touch-down) and a flick can be easily done even by one unintentionally touching the touch panel portion 111. Therefore, for example, in the state of "opened—inverted, EVF: disabled" (FIG. 3G), acceptance of touch operations such as a single touch and a flick is disabled. On the other hand, an act of gesturing (an act of activating a function when the path of a move satisfies predetermined conditions) and an act of moving a specific display item to a specific position by dragging the same are acts that cannot be done unless the user definitely intends to do them. Therefore, acceptance of touch operations such as gesturing and dragging is enabled.

In the present embodiment, when the display function and the touch panel function of the touch panel portion 111 are to be controlled, a subject image is displayed as a through-the-lens image. The present invention, however, is not limited to this, but the above described control may be applied to a case where already taken and recorded video pictures and still images are reproduced and displayed in parallel on the touch panel portion 111 and the EVF 102.

In the present embodiment, the position of the movable panel 110 about the first rotation axis C1 in the opening or closing direction and the position of the movable panel 110 about the second rotation axis C2 in the vertical rotational direction are detected, and combinations of them are used for control. However, from the viewpoint of making it possible to produce displays and limit touch operations to be accepted according to situations, the movable panel 110 should not necessarily be a rotary one, much less one which is movable in the directions of two axes. Moreover, when the movable panel 110 is configured to be rotate in the directions of two axes, these two axes should not necessarily be perpendicular to each other.

For example, assume that the movable panel 110 is simply configured to be able to only open and close about the first rotation axis C1. In this case, the display function and the touch panel function of the touch panel portion 111 may be controlled based on two positions, i.e. the position of the movable panel 110 being opened or closed and the position of the EVF 102.

In particular, electronic apparatuses to which the present invention is applied are not limited to the digital video camera 100 and image pickup apparatuses such as a digital still camera, and the optimum way to control the display function and the touch panel function of the touch panel portion 111 varies according to electronic apparatuses to which the present invention is applied. The present invention may be applied to an electronic apparatus as long as it is capable of displaying images in parallel on a first display unit that is movable and has a display function and a touch panel function, and a second display unit different form the first display unit. Therefore, the present invention may be applied to a personal computer, a PDA, a cellular phone terminal, a portable image viewer, a printer apparatus having a display, a digital photo frame, a music player, a game machine, an electronic book reader, or the like.

Although in the present embodiment, the EVF 102 is taken as an example of those on which the same image as an image displayed on the touch panel portion 111 is displayed, the present invention is not limited to this, but an optical finder or an external monitor may be used. A description will be given of this variation with reference to FIG. 6.

Figure 6:
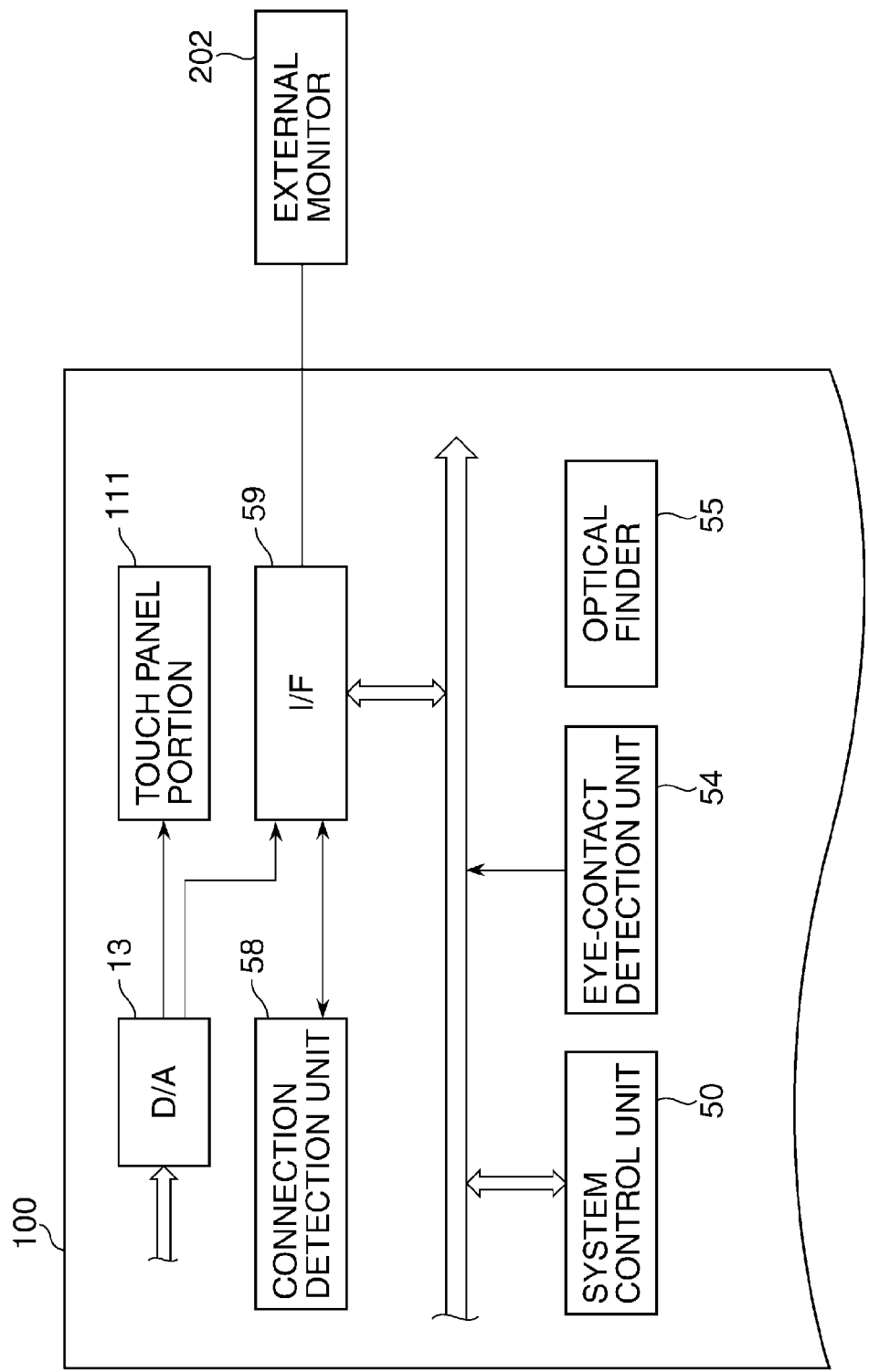
FIG. 6 is a block diagram schematically showing a part of an internal arrangement of a camera according to a variation.

FIG. 6 is a block diagram schematically showing a part of an internal arrangement of the camera 100 according to the variation, in which some component elements are not shown.

In the variation in FIG. 6, the camera 100 is provided with an optical finder 55 as a second display unit in place of the EVF 102, and is configured so that an external monitor 202 can be connected to the camera 100. Further, the camera 100 is additionally provided with an eye-contact detection unit 54, an I/F 59, and a connection detection unit 58. These are differences from the example in FIG. 2, and the other component elements in the camera 100 are not shown.

The I/F 59 has the external monitor 202 electrically connected thereto. The connector 105 mentioned above may be a terminal of the I/F 59. Moreover, the connection detection unit 58 detects whether or not the external monitor 202 is connected to the I/F 59, and notifies the system control unit 50 of information on this. When the external monitor 202 is connected to the I/F 59, display image data written into the memory 32 (FIG. 2) is displayed on not only the touch panel portion 111 via the D/A converter 13 but also the external monitor 202 via the I/F 59 under the control of the system control unit 50. When the connection detection unit 58 detects the external monitor 202 being connected to the I/F 59 via a connection cable, not shown, the system control unit 50 determines that the external monitor 202 is in use.

An optical image is displayed on the optical finder 55. The eye-contact detection unit 54 detects whether or not the user's eye contacts the optical finder 55, and notifies the system control unit 50 of the detection result. Whether or not a user's eye contacts the optical finder 55 may be detected using a well-known method as disclosed in Japanese Laid-Open Patent Publication (Kokai) No. 2007-86460. For example, a contact sensor is provided with the apparatus main body 101 at such a position as to be touched by the user's nose when the user looks through the optical finder 55, and eye-contact is detected by detecting contact using the contact sensor. When the eye-contact detection unit 54 detects the user looking through the optical finder 55, the system control unit 50 determines that the optical finder 55 is in use.

With this arrangement, first, in a case where the optical finder 55 is used, the control over the display function and the touch panel function of the touch panel portion 111 described above (the function control process in FIG. 5) is processed as described hereafter. Namely, in the function control process in FIG. 5, the control is performed based on the result of determination as to whether or not the optical finder 55 is in use, not based on the result of determination as to whether or not the EVF 102 is in use. On the other hand, in a case where the external monitor 202 is used, the control in the function control process in FIG. 5 is performed based on the result of determination as to whether or not the external monitor 202 is in use, not based on the result of determination as to whether or not the EVF 102 is in use.

It should be noted that in this variation, only one of the optical finder 55 and the external monitor 202 may be adopted. In a case where both of them are adopted at the same time, the same control as in the case where the EVF 102 is in use may be performed in the function control process in FIG. 5 when it can be determined that at least one of them is in use.

It should be noted that the external monitor 202 is of a wired type, but may be of a wireless type. Also, the external monitor 202 should not necessarily be a monitor exclusively means for display, but may be a display unit provided in an electronic apparatus such as another image pickup apparatus or the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-264959 filed Nov. 29, 2010, which is hereby incorporated by reference herein in its entirety.

What is claimed is:

1. An image pickup apparatus capable of displaying images in parallel on a first display unit, which is movable relative to an image pickup apparatus main body having an image pickup unit and includes a touch panel function, and a second display unit, comprising:

a detection unit configured to be capable of detecting a position of the first display unit with respect to the image pickup apparatus main body;

a determination unit configured to determine whether the second display unit is in use; and a control unit configured to perform control to produce displays on the first display and disable at least a part of the touch panel function when said detection unit detects a display surface of the first display unit being at such a position as to face a subject taken by the image pickup unit, and said determination unit determines that the second display unit is in use, wherein said detection unit comprises a first detection unit that detects a position of the first display unit around a first axis that is a rotation axis about which the first display unit rotates from a closed position to an opened position relative to the image pickup apparatus main body in opening and closing directions, and a second detection unit that detects a position of the first display unit around a second axis that is a rotation axis about which the first display unit rotates from a normal position to an inverted position relative to the image pickup apparatus main body, and wherein the position at which the surface of the first display unit faces the subject is a position in a case where the position of the first display unit around the first axis detected by the first detection unit is outside a range of a first predetermined angle in a direction from the closed position toward the opening position, and the position of the first display unit around the second axis detected by the second detection unit is outside a range of a second predetermined angle in a direction from the normal position toward the inverted position.

2. The image pickup apparatus according to claim 1, wherein said control unit performs control to cause the first display unit to produce a through-the-lens image display to successively display images taken by the image pickup unit.

3. The image pickup apparatus according to claim 1, wherein said control unit performs control to produce displays on the first display unit and enable the touch panel function when said detection unit detects the display surface of the first display unit being at such a position as to face the subject, and said determination unit determines that the second display unit is not in use.

4. The image pickup apparatus according to claim 1, wherein said control unit performs control to produce displays on the first display unit and enable the touch panel function when said detection unit detects the display surface of the first display unit being at such a position as to face an opposite side of the subject with respect to a direction of an optical axis, and said determination unit determines that the second display unit is in use.

5. The image pickup apparatus according to claim 1, wherein said control unit performs control to disable a function corresponding to a touch operation on a part of a surface of the first display unit among the touch panel functions when said detection unit detects the display surface of the first display unit being at such a position as to face the subject, and said determination unit determines that the second display unit is in use.

6. The image pickup apparatus according to claim 1, wherein said control unit performs control to disable a function corresponding to a touch operation of a specific type among the touch panel functions when said detection unit detects the display surface of the first display unit being at such a position as to face the subject, and said determination unit determines that the second display unit is in use.

7. The image pickup apparatus according to claim 6, wherein the touch operation of the specific type is at least one of a single touch that is an act of touching once and then releasing the display surface of the first display unit, and a flick that is an act of moving while touching the display surface and then releasing the display surface.

8. The image pickup apparatus according to claim 6, wherein when said detection unit detects the display surface of the first display unit being at such a position as to face the subject, and said determination unit determines that the second display unit is in use, said control unit performs control to receive a gesture operation that activates a function thereof when a moving path taken at a time of moving while touching the display surface of the first display unit satisfies predetermined conditions, and a drag operation that is an act of touching a specific display item displayed on the display surface and moving to a specific position while touching the display surface.

9. The image pickup apparatus according to claim 1, wherein said control unit performs control to display a warning on the first display unit when said detection unit detects the display surface of the first display unit being at such a position as to face the subject, and said determination unit determines that the second display unit is in use.

10. The image pickup apparatus according to claim 1, wherein the second display unit is a viewfinder-type display unit provided in the image pickup apparatus main body, for observing a subject image.

11. The image pickup apparatus according to claim 9, wherein the second display unit is movable to a retracted position and a drawn-out position relative to the image pickup apparatus main body, and when the second display unit is at the retracted position, said determination unit determines that the second display unit is not in use, and when the second display unit is at the drawn-out position, said determination unit determines that the second display unit is in use.

12. The image pickup apparatus according to claim 1, wherein the second display unit is an electronic viewfinder provided in the image pickup apparatus main body, for displaying images taken by the image pickup unit, and said determination unit determines whether the second display unit is in use based on whether the second display unit is producing a display.

13. The image pickup apparatus according to claim 1, wherein the second display unit is an optical finder provided in the image pickup apparatus main body, for observing an optical image of a subject, and said determination unit determines whether the second display unit is in use based on whether a user's eye is in contact with the optical finder.

14. The image pickup apparatus according to claim 1, wherein the second display unit is an external monitor connected to the image pickup apparatus with or without wires.

15. The image pickup apparatus according to claim 14, wherein when the external monitor connected to the image pickup apparatus main body is detected, said determination unit determines that the second display unit is in use.

16. A control method for an image pickup apparatus capable of displaying images in parallel on a first display unit, which is movable relative to an image pickup apparatus main body having an image pickup unit and includes a touch panel function, and a second display unit, comprising:
 a detection step of detecting a position of the first display unit with respect to the image pickup apparatus main body;
 a determination step of determining whether the second display unit is in use; and
 a control step of performing control to produce displays on the first display and disable at least a part of the touch panel function when a display surface of the first display unit being at such a position as to face a subject taken by the image pickup unit is detected in said detection step, and it is determined in said determination step that the second display unit is in use,
 wherein said detection step comprises a first detection step of detecting a position of the first display unit around a first axis that is a rotation axis about which the first display unit rotates from a closed position to an opened position relative to the image pickup apparatus main body in opening and closing directions, and a second detection step of detecting a position of the first display unit around a second axis that is a rotation axis about which the first display unit rotates from a normal position to an inverted position relative to the image pickup apparatus main body, and
 wherein the position at which the surface of the first display unit faces the subject is a position in a case where the position of the first display unit around the first axis detected by the first detection step is outside a range of a first predetermined angle in a direction from the closed position toward the opening position, and the position of the first display unit around the second axis detected by the second detection step is outside a range of a second predetermined angle in a direction from the normal position toward the inverted position.

17. A computer-readable non-transitory storage medium storing a program for implementing a control method for an image pickup apparatus capable of displaying images in parallel on a first display unit, which is movable relative to an image pickup apparatus main body having an image pickup unit and includes a touch panel function, and a second display unit, comprising:
 a detection step of detecting a position of the first display unit with respect to the image pickup apparatus main body;
 a determination step of determining whether the second display unit is in use; and a control step of performing control to produce displays on the first display and disable at least a part of the touch panel function when a display surface of the first display unit being at such a position as to face a subject taken by the image pickup unit is detected in said detection step, and it is determined in said determination step that the second display unit is in use, wherein said detection step comprises a first detection step of detecting a position of the first display unit around a first axis that is a rotation axis about which the first display unit rotates from a closed position to an opened position relative to the image pickup apparatus main body in opening and closing directions, and a second detection step of detecting a position of the first display unit around a second axis that is a rotation axis about which the first display unit rotates from a normal position to an inverted position relative to the image pickup apparatus main body, and wherein the position at which the surface of the first display unit faces the subject is a position in a case where the position of the first display unit around the first axis detected by the first detection step is outside a range of a first predetermined angle in a direction from the closed position toward the opening position, and the position of the first display unit around the second axis detected by the second detection step is outside a range of a second predetermined angle in a direction from the normal position toward the inverted position.

18. An image pickup apparatus capable of displaying images in parallel on a first display unit, which is movable relative to an image pickup apparatus main body having an image pickup unit and includes a touch panel function, and a second display unit, comprising:
- a detection unit configured to be capable of detecting a position of the first display unit with respect to the image pickup apparatus main body;
- a determination unit configured to determine whether the second display unit is in use; and
- a control unit configured to perform control to produce displays on the first display and disable whole touch panel functions when said detection unit detects a display surface of the first display unit being at such a position as to face a subject taken by the image pickup unit, and said determination unit determines that the second display unit is in use.

19. An image pickup apparatus capable of displaying images in parallel on a first display unit, which is movable relative to an image pickup apparatus main body having an image pickup unit and includes a touch panel function, and a second display unit, comprising:
- a detection unit configured to be capable of detecting a position of the first display unit with respect to the image pickup apparatus main body;
- a determination unit configured to determine whether the second display unit is in use; and
- a control unit configured to perform control to produce displays on the first display, disable acceptance of a single touch that is an act of touching once and then releasing a display surface of the first display unit, and enable acceptance of a gesture operation that activates a function thereof when a moving path taken at a time of moving while touching the display surface of the first display unit satisfies predetermined conditions, and/or a drag operation that is an act of touching a specific display item displayed on the display surface and moving to a specific position while touching the display surface when said detection unit detects the display surface of the first display unit being at such a position as to face a subject taken by the image pickup unit, and said determination unit determines that the second display unit is in use.

20. A control method for an image pickup apparatus capable of displaying images in parallel on a first display unit, which is movable relative to an image pickup apparatus main body having an image pickup unit and includes a touch panel function, and a second display unit, the method comprising:
- a detection step of detecting a position of the first display unit with respect to the image pickup apparatus main body;
- a determination step of determining whether the second display unit is in use; and
- a control step of performing control to produce displays on the first display and disable whole touch panel functions when said detection step detects a display surface of the first display unit being at such a position as to face a subject taken by the image pickup unit, and said determination step determines that the second display unit is in use.

21. A computer-readable non-transitory storage medium storing a program for implementing a control method for an image pickup apparatus capable of displaying images in parallel on a first display unit, which is movable relative to an image pickup apparatus main body having an image pickup unit and includes a touch panel function, and a second display unit, the method comprising:
- a detection step of detecting a position of the first display unit with respect to the image pickup apparatus main body;
- a determination step of determining whether the second display unit is in use; and
- a control step of performing control to produce displays on the first display and disable whole touch panel functions when said detection step detects a display surface of the first display unit being at such a position as to face a subject taken by the image pickup unit, and said determination step determines that the second display unit is in use.

22. A control method for an image pickup apparatus capable of displaying images in parallel on a first display unit, which is movable relative to an image pickup apparatus main body having an image pickup unit and includes a touch panel function, and a second display unit, the method comprising:
- a detection step of detecting a position of the first display unit with respect to the image pickup apparatus main body;
- a determination step of determining whether the second display unit is in use; and
- a control step of performing control to produce displays on the first display, disable acceptance of a single touch that is an act of touching once and then releasing a display surface of the first display unit, and enable acceptance of a gesture operation that activates a function thereof when a moving path taken at a time of moving while touching the display surface of the first display unit satisfies predetermined conditions, and/or a drag operation that is an act of touching a specific display item displayed on the display surface and moving to a specific position while touching the display surface when said detection step detects the display surface of the first display unit being at such a position as to face a subject taken by the image pickup unit, and said determination step determines that the second display unit is in use.

23. A computer-readable non-transitory storage medium storing a program for implementing a control method for an image pickup apparatus capable of displaying images in parallel on a first display unit, which is movable relative to an image pickup apparatus main body having an image pickup unit and includes a touch panel function, and a second display unit, the method comprising:
- a detection step of detecting a position of the first display unit with respect to the image pickup apparatus main body;
- a determination step of determining whether the second display unit is in use; and
- a control step of performing control to produce displays on the first display, disable acceptance of a single touch that is an act of touching once and then releasing a display surface of the first display unit, and enable acceptance of a gesture operation that activates a function thereof when a moving path taken at a time of moving while touching the display surface of the first display unit satisfies predetermined conditions, and/or a drag operation that is an act of touching a specific display item displayed on the display surface and moving to a specific position while touching the display surface when said detection step detects the display surface of the first display unit being at such a position as to face a subject taken by the image pickup unit, and said determination step determines that the second display unit is in use.

* * * * *